JOHN ASHCROFT.
Improvement in Process for Maturing and Curing Green Leaf Tobacco.
No. 123,760. Patented Feb. 20, 1872.

Sectin on line x.x.

Section on z.z.

Witnesses: Fred Arto's, A. C. Faber

Inventor: John Ashcroft

UNITED STATES PATENT OFFICE.

JOHN ASHCROFT, OF BROOKLYN, NEW YORK, ASSIGNOR TO SARAH JANE ASHCROFT, OF SAME PLACE.

IMPROVEMENT IN PROCESSES FOR MATURING AND CURING GREEN LEAF-TOBACCO.

Specification forming part of Letters Patent No. 123,760, dated February 20, 1872.

Specification describing certain Improvements in the Process and Apparatus for Curing or Maturing the Raw or Green Tobacco-Leaf, invented by JOHN ASHCROFT, of Brooklyn, county of Kings and State of New York.

The first part of my invention consists in a certain new and improved process for curing and maturing the raw or green tobacco-leaf, by means of artificial heat, ventilation, and evaporation, &c., gaining many months over the usual well-known method of doing it in drying-houses in the open air, which jeopardises, to a great extent, the desirable curing; and by my process there is a great gain in weight, less loss of aroma, and leaving the leaf in a better condition for manufacturing purposes. The second part of my invention consists in an improved apparatus for effecting the purposes above described .The usual method of "curing" tobacco is too well known to need description here, usually taking from six to eight months, thereby losing much time, and by atmospheric evaporation, the good qualities of the leaf, its strong pungent aroma, which characterises its nature; and then much risk is run arising from variable temperature, moisture of the atmosphere, frost, worms, &c. By my process I can accomplish in as many hours, and better too, without any risk, what, under the most favorable circumstances, is accomplished in as many months. An entire crop of tobacco—say ten or fifteen acres—can be cured in one day, and made fit for the market, or for packing in cases or hogsheads, &c.

Figure 1:
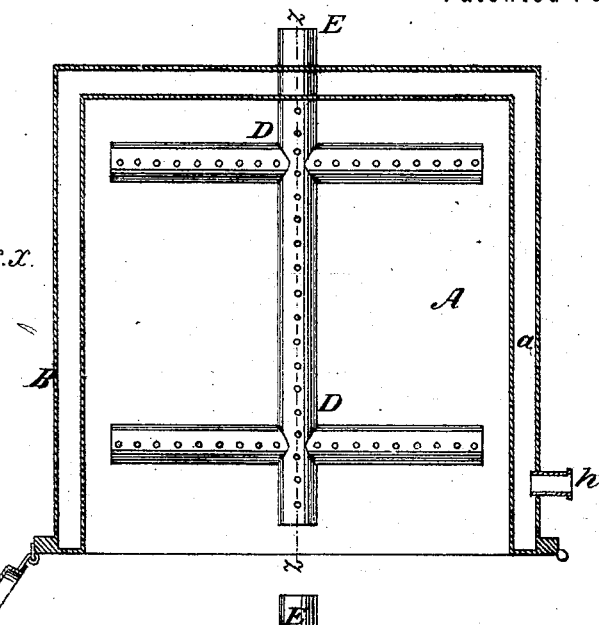
Figure 2:
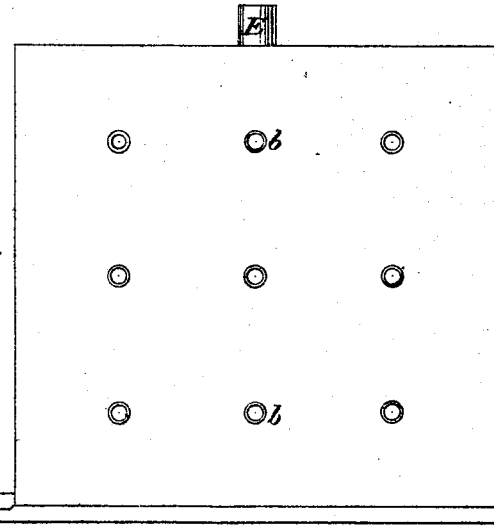
Figure 3:
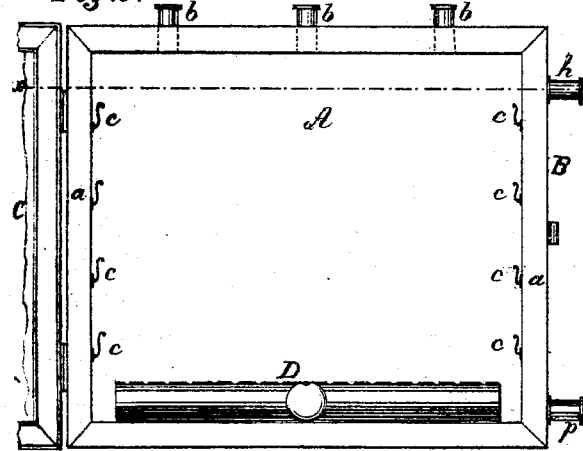
Figure 4:
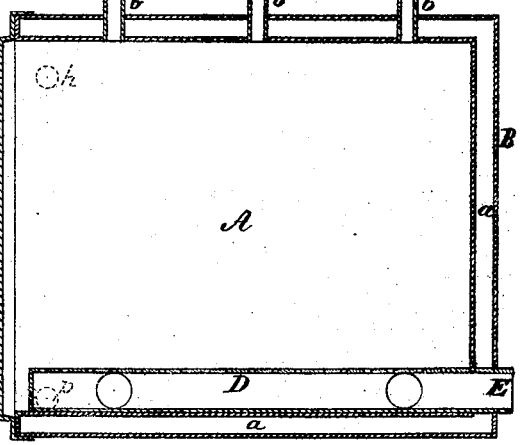

In the drawing, Figure 1 shows a horizontal section of my improved apparatus on line $x\ x$, Fig. 3, which consists of a chamber, A, surrounded by a jacket, B, leaving an intervening space, $a$, into which steam is introduced through a pipe, $h$. C represents a door closing the chamber A. Fig. 2 is a top view of my apparatus; Fig. 3, a front view, the door C being open. Fig. 4 is a longitudinal section on line $z\ z$, Fig. 1.

$b$ represents ventilating pipes leading from the inner chamber A to the outside to carry off the moisture given out by the curing, drying, or sweating and evaporating process. D is any system of perforated pipes in the bottom of chamber A, and one or more of its ends pass out to the exterior of the apparatus, as seen at E.

To get the requisite drying air and ventilation I propose using a hot-air chamber to be heated outside by means of a coil of pipe or other calorific agency, and using a fan or blower to force the air so heated into the pipes D through the orifice E, and then it passes out of the openings in said pipe D, over which the tobacco is suspended in any suitable way, and for which purpose hooks, $c$, are attached to the walls of the inner chamber A. I can use cold air, if desirable, instead of hot, a strong current promoting evaporation and keeping the leaves in a state of agitation. The moisture given out is driven through the pipes $b$ to the outside. The steam in the space $a$ surrounding the chamber A on all sides but one, gives desirable degree of heat for the chamber A; or I can use hot air therein instead of steam; and when using this latter a suitable outlet, $p$, Fig. 3, is necessary to let off the condensed steam. Instead of the space $a$ and the jacket B coils of pipe heated by steam can be arranged in the bottom of the chamber A or around its sides, or hot air can be forced into the pipes.

To carry out my invention on a large scale I propose to construct drying-houses made of suitable materials, and operated substantially as herein shown and described, whereby whole crops can be cured at one operation.

Having thus described my invention, what I claim as new, and desire to secure by Letters Patent of the United States, is—

1. The process herein described for curing green tobacco—viz., by suspending and subjecting it in a partially closed chamber to heat introduced therein by conduction, and a direct and forced current of common or dried air to create a circulation through and agitation of the leaves of the tobacco, to carry off the vapors, substantially as described.

2. I also claim the herein-described apparatus for curing green tobacco, consisting of the chamber A, with steam-space around or connected with it, appliances $c$ for suspending the green tobacco therein, and inlet and air-passages D $b$ for introducing and creating circulation of the air through and agitation of the leaves of tobacco, and carrying off and out of the chamber the vapors thereof, as described and represented.

JOHN ASHCROFT.

Witnesses:
EDM. F. BROWN,
A. V LEIBIN.